United States Patent
Zhao et al.

(10) Patent No.: US 11,860,749 B2
(45) Date of Patent: Jan. 2, 2024

(54) METHOD AND APPARATUS FOR SENDING DEBUGGING INSTRUCTION

(71) Applicant: BEIJING BAIDU NETCOM SCIENCE AND TECHNOLOGY CO., LTD., Beijing (CN)

(72) Inventors: Xin Zhao, Beijing (CN); Danfeng Lu, Beijing (CN); Jingru Xie, Beijing (CN); Sheng Chen, Beijing (CN)

(73) Assignee: BEIJING BAIDU NETCOM SCIENCE AND TECHNOLOGY CO., LTD, Beijing (CN)

( * ) Notice: Subject to any disclaimer, the term of this patent is extended or adjusted under 35 U.S.C. 154(b) by 262 days.

(21) Appl. No.: 17/317,393

(22) Filed: May 11, 2021

(65) Prior Publication Data

US 2021/0263817 A1    Aug. 26, 2021

(30) Foreign Application Priority Data

Nov. 9, 2020  (CN) .......................... 202011239460.1

(51) Int. Cl.
    *G06F 11/26*     (2006.01)
    *H04W 76/10*    (2018.01)
    *H04L 67/125*   (2022.01)

(52) U.S. Cl.
    CPC ............ *G06F 11/26* (2013.01); *H04L 67/125* (2013.01); *H04W 76/10* (2018.02)

(58) Field of Classification Search
    CPC ....... G06F 11/26; H04W 76/10; H04L 67/125
    See application file for complete search history.

(56) References Cited

U.S. PATENT DOCUMENTS

| 2008/0165789 A1* | 7/2008 | Ansari | H04W 12/35 370/401 |
| 2015/0261650 A1* | 9/2015 | Li | H04L 67/56 717/124 |

(Continued)

FOREIGN PATENT DOCUMENTS

| CN | 103856361 A | 6/2014 |
| CN | 104253749 A | 12/2014 |

(Continued)

OTHER PUBLICATIONS

Machine Translation of Chinese Application Document Id CN-104253749-A into English, Guan et al., Publication Date Dec. 31, 2014 (Year: 2014).*

(Continued)

*Primary Examiner* — Matthew M Kim
*Assistant Examiner* — Indranil Chowdhury
(74) *Attorney, Agent, or Firm* — Seed IP Law Group LLP (57) ABSTRACT

A method and apparatus for sending a debugging instruction, an electronic device and a computer readable storage medium are provided. The method may include: after acquiring a debugging instruction sent by an operating terminal, determining a debugged terminal and a first edge communication node corresponding to the debugged terminal according to the debugging instruction, and determining a debugging communication link between the first edge communication node and the debugged terminal, the first edge communication node being determined based on first edge communication node information sent by the debugged terminal, and the first edge communication node information being determined and obtained based on an edge node computing application locally installed on the debugged terminal, and sending an debugging operation included in (Continued)

the debugging instruction to the debugged terminal through the debugging communication link.

18 Claims, 5 Drawing Sheets

(56) References Cited

U.S. PATENT DOCUMENTS

| | | | |
|---|---|---|---|
| 2019/0335033 A1* | 10/2019 | Huang | G06F 9/4406 |
| 2020/0244539 A1* | 7/2020 | Fiennes | H04L 41/12 |
| 2020/0301818 A1 | 9/2020 | Periyaeluvan et al. | |
| 2022/0117036 A1* | 4/2022 | Moustafa | H04W 24/04 |
| 2023/0216947 A1* | 7/2023 | Bernardi | H04L 63/10 |
| | | | 713/150 |

FOREIGN PATENT DOCUMENTS

| | | | | |
|---|---|---|---|---|
| CN | 106708489 A | 5/2017 | | |
| CN | 107800791 A | 3/2018 | | |
| CN | 107948317 A | 4/2018 | | |
| CN | 110413329 A | 11/2019 | | |
| CN | 110740162 A | 1/2020 | | |
| WO | WO-0017766 A2 * | 3/2000 | | G06F 1/26 |
| WO | WO-2012077704 A1 * | 6/2012 | | G06F 11/2268 |
| WO | WO-2014082577 A1 * | 6/2014 | | G06F 11/362 |
| WO | 2018/027018 A1 | 2/2018 | | |
| WO | WO-2020134634 A1 * | 7/2020 | | G06F 1/26 |
| WO | WO-2022251583 A1 * | 12/2022 | | G06F 11/3656 |

OTHER PUBLICATIONS

Chinese Office Action for Chinese Application No. 202011239460.1, dated Dec. 1, 2021, 9 pages.

Jian, Ma, "Design and implementation based on Web equipment remote monitoring system," with English abstract, North University of China, May 30, 2016, 70 pages.

* cited by examiner

METHOD AND APPARATUS FOR SENDING DEBUGGING INSTRUCTION

CROSS-REFERENCE TO RELATED APPLICATIONS

This application claims priority to Chinese Application No. 202011239460.1, filed on Nov. 9, 2020 and entitled "Method and Apparatus for Sending Debugging Instruction," the content of which is hereby incorporated by reference in its entirety.

TECHNICAL FIELD

Embodiments of the present disclosure relate to the field of cloud computing, specifically to the field of remote debugging technology and data transmission technology, and more specifically to a method and apparatus for sending a debugging instruction, an electronic device and a computer readable storage medium.

BACKGROUND

At present, in the field of Internet of Things, in order to better understand the operating status of a remote device, it is generally necessary to monitor the remote device.

However, the existing tools having remote debugging function, not only require additional environment deployment during remote debugging, but also lack the ability to monitor and debug the host, and are not closely integrated with edge computing powers.

SUMMARY

Embodiments of the present disclosure provide a method and apparatus for sending a debugging instruction, an electronic device and a computer readable storage medium.

In a first aspect, an embodiment of the present disclosure provides a method for sending a debugging instruction, the method including: acquiring a debugging instruction sent by an operating terminal, and determining a debugged terminal according to the debugging instruction; determining a first edge communication node corresponding to the debugged terminal, and determining a debugging communication link between the first edge communication node and the debugged terminal; the first edge communication node being determined based on first edge communication node information sent by the debugged terminal, and the first edge communication node information being determined and obtained based on an edge node computing application locally installed on the debugged terminal; and sending a debugging operation included in the debugging instruction to the debugged terminal through the debugging communication link.

In a second aspect, an embodiment of the present disclosure provides an apparatus for sending a debugging instruction, the apparatus including: a debugged terminal determination unit, configured to acquire a debugging instruction sent by an operating terminal, and determine a debugged terminal according to the debugging instruction; a communication link determination unit, configured to determine a first edge communication node corresponding to the debugged terminal, and determine a debugging communication link between the first edge communication node and the debugged terminal; the first edge communication node being determined based on first edge communication node information sent by the debugged terminal, and the first edge communication node information being determined and obtained based on an edge node computing application locally installed on the debugged terminal; and a debugging operation sending unit, configured to send a debugging operation included in the debugging instruction to the debugged terminal through the debugging communication link.

In a third aspect, an embodiment of the present disclosure provides an electronic device, the device electronic including: at least one processor; and a memory, communicatively connected with the at least one processor, the memory storing instructions executable by the at least one processor, the instructions, when executed by the at least one processor, causing the at least one processor to perform the method for sending a debugging instruction according to any embodiment.

In a fourth aspect, an embodiment of the present disclosure provides a non-transitory computer readable storage medium, storing computer instructions, the computer instructions being used to cause a computer to perform the method for sending a debugging instruction according to any embodiment.

It should be understood that the content described in this section is not intended to identify key or important features of embodiments of the present disclosure, nor is it intended to limit the scope of embodiments of the present disclosure. Other features of embodiments of the present disclosure may be easily understood by the following description.

BRIEF DESCRIPTION OF THE DRAWINGS

The accompanying drawings are used to better understand the present solution and do not constitute a limitation to the present disclosure.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as illustrative only. Accordingly, it should be recognized by one of the ordinary skilled in the art that various changes and modifications may be made to embodiments described herein without departing from the scope and spirit of the present disclosure. Also, for clarity and conciseness, descriptions for well-known functions and structures are omitted in the following description.

It should also be noted that some embodiments in the present disclosure and some features in the disclosure may be combined with each other on a non-conflict basis. Features of the present disclosure will be described below in detail with reference to the accompanying drawings and in combination with embodiments.

In embodiments of the present disclosure, after acquiring a debugging instruction sent by an operating terminal, a debugged terminal and a first edge communication node corresponding to the debugged terminal are determined according to the debugging instruction, and a debugging communication link between the first edge communication node and the debugged terminal is determined, the first edge communication node is determined based on first edge communication node information sent by the debugged terminal, and the first edge communication node information is determined and obtained based on an edge node computing application locally installed on the debugged terminal.

In embodiments of the present disclosure, by determining the corresponding first edge communication node through the edge node computing application installed on the side of the debugged terminal, and determining the corresponding debugging communication link based on the first edge communication node, local resources of an executing body of the method for sending a debugging instruction may be saved, and the efficiency of sending a debugging instruction may be improved.

Figure 1:
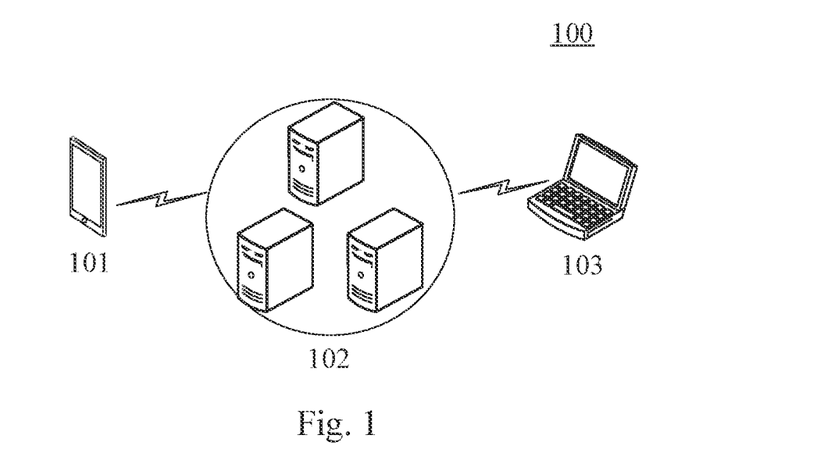
FIG. 1 is an example system architecture in which embodiments of the present disclosure may be implemented.

FIG. 1 shows an example system architecture 100 in which a method and apparatus for sending a debugging instruction, an electronic device and a computer readable storage medium of embodiments of the present disclosure may be applied.

As shown in FIG. 1, the system architecture 100 may include an edge computing network 102 composed of a plurality of edge nodes, a first terminal device 101 and a second terminal device 103. Both of the first terminal device 101 and the second terminal device 103 may implement data transmission with the edge computing network 102 in various methods such as wired or wireless communication links, or optic fibers.

A user may use the first terminal device 101 to implement various management and control on the second terminal device 103 through the edge computing network 102. For example, the user may send a debugging instruction to the edge computing network 102 using the first terminal device 101 to remotely debug the second terminal device 103, so that the debugging instruction is sent to the second terminal device 103 by using characteristics of the edge computing network. The above operations may be implemented with the help of applications installed in the first terminal device 101, installed in any computing node that forms the edge computing network 102, and installed in the second terminal device 103, such as remote monitoring applications, remote control applications, or applications for remote debugging of terminals.

The terminal devices 101 and 103 are generally embodied as hardware in different forms, for example, electronic devices such as smart phones, tablet computers, laptop computers, and desktop computers.

It should be noted that the method for sending a debugging instruction provided by embodiments of the present disclosure is generally performed by the edge computing network 102. Accordingly, an apparatus for sending a debugging instruction may generally be represented as any edge computing node in the edge computing network 102.

It should be understood that numbers of the first terminal device and the second terminal device in FIG. 1 are merely illustrative. In addition, the first terminal device that initiates the debugging instruction may also be the terminal device that receives the debugging instruction.

Figure 2:
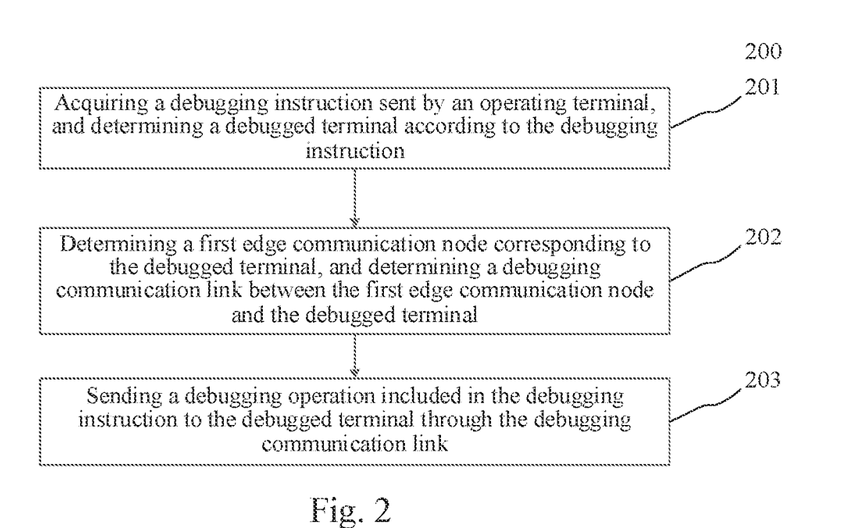
FIG. 2 is a flowchart of a method for sending a debugging instruction according to an embodiment of the present disclosure.

With further reference to FIG. 2, a flow 200 of a method for sending a debugging instruction according to an embodiment of the present disclosure is illustrated. The method for sending a debugging instruction includes the following steps.

Step 201, acquiring a debugging instruction sent by an operating terminal, and determining a debugged terminal according to the debugging instruction.

In the present embodiment, an executing body of the method for sending a debugging instruction (for example, the edge computing network 102 shown in FIG. 1) may generally directly acquire the debugging instruction sent by a user using a non-local human-computer interaction device as the operating terminal from the non-local human-computer interaction device (for example, the first terminal device 101 shown in FIG. 1). In addition, the user may also pre-determine the debugging instruction and a predetermined triggering rule through the operating terminal, and then send the debugging instruction and the triggering rule to the executing body of the method for sending a debugging instruction. The executing body acquires the debugging instruction when the predetermined triggering rule is satisfied, which is not limited in the present disclosure.

The debugging instruction is generally sent through an existing communication link between the operating terminal and the executing body. The debugging instruction includes related information used to indicate the debugged terminal, for example, information such as a terminal name, a terminal version or a terminal location of a target debugged terminal. After acquiring the debugging instruction, the executing body may determine the target, that is, the debugged terminal, based on the related information of the debugged terminal in the debugging instruction.

It should be understood that the debugging instruction includes at least a debugging operation that hopes to designate the debugged terminal to perform the corresponding operation.

Step 202, determining a first edge communication node corresponding to the debugged terminal, and determining a debugging communication link between the first edge communication node and the debugged terminal.

In the present embodiment, generally, a plurality of communication nodes may be established locally on the executing body in advance, and then these communication nodes are used to represent different debugging terminals, respectively. The nodes established locally may include some system modules and user-specified functional modules by default for communication between the deployed debugging terminals and the executing body, communication between the modules on the terminal side, and realization of application functions, etc.

Through online installation, offline installation package, image burning, etc., an edge node computing application is deployed in the debugged terminal that supports remote debugging in advance. After the edge node computing application is deployed in the debugged terminal, the computing application may automatically start to build system and non-system modules, where a system core module may automatically establish a communication link with the executing body, that is, the debugging communication link.

An establishment method of the debugging communication link includes but not limited to websocket, http, mqtt, http3 and other methods.

It should be understood that the debugged terminal may determine the edge node used for communication between the executing body and the debugged terminal, that is, the first edge communication node, based on the locally installed edge node computing application, and the debugged terminal may send the determined first edge communication node to the executing body, so that the executing body may determine the debugging communication link with the debugged terminal based on the first edge communication node. The executing body may communicate with the debugged terminal through the first communication node and the debugging communication link. Through the debugging communication link, the debugged terminal may periodically report local system information of the debugged terminal, operating status of the functional modules, etc. to the executing body, and the debugged terminal may also receive resource data, command information, etc. sent by the executing body through the debugging communication link.

After the establishment of the debugging communication link between at least one debugged terminal and the executing body is completed, subsequently, the corresponding debugging communication link may be determined based on the debugged terminal determined in the debugging instruction to implement communication.

Step 203, sending a debugging operation included in the debugging instruction to the debugged terminal through the debugging communication link.

In the present embodiment, after the debugging communication link with the debugged terminal is established in step 202 above, the debugging operation in the received debugging instruction is sent to the corresponding debugged terminal through the debugging communication link, to realize the corresponding debugging operation.

The debugging operation may be an operation such as a remote login, real-time monitoring, online debugging, system or application log collection for the debugged terminal locally, or may be an operation instructing the debugged terminal to extract a log and collect data from another device controlled and monitored by the debugged terminal, or may be an operation instructing the debugged terminal to control another device, which is not limited in the present disclosure.

According to the method for sending a debugging instruction provided by the present embodiment, after acquiring the debugging instruction sent by the operating terminal, the debugged terminal and the first edge communication node corresponding to the debugged terminal are determined according to the debugging instruction, and the debugging communication link between the first edge communication node and the debugged terminal is determined, the first edge communication node is determined based on the first edge communication node information sent by the debugged terminal, and the first edge communication node information is determined and obtained based on the edge node computing application locally installed on the debugged terminal, and the debugging operation included in the debugging instruction is sent to the debugged terminal through the debugging communication link.

In embodiments of the present disclosure, by determining the corresponding first edge communication node through the edge node computing application installed on the side of the debugged terminal, and determining the corresponding debugging communication link based on the first edge communication node, local resources of the executing body of the method for sending a debugging instruction may be saved, and the efficiency of sending a debugging instruction may be improved.

Figure 3:
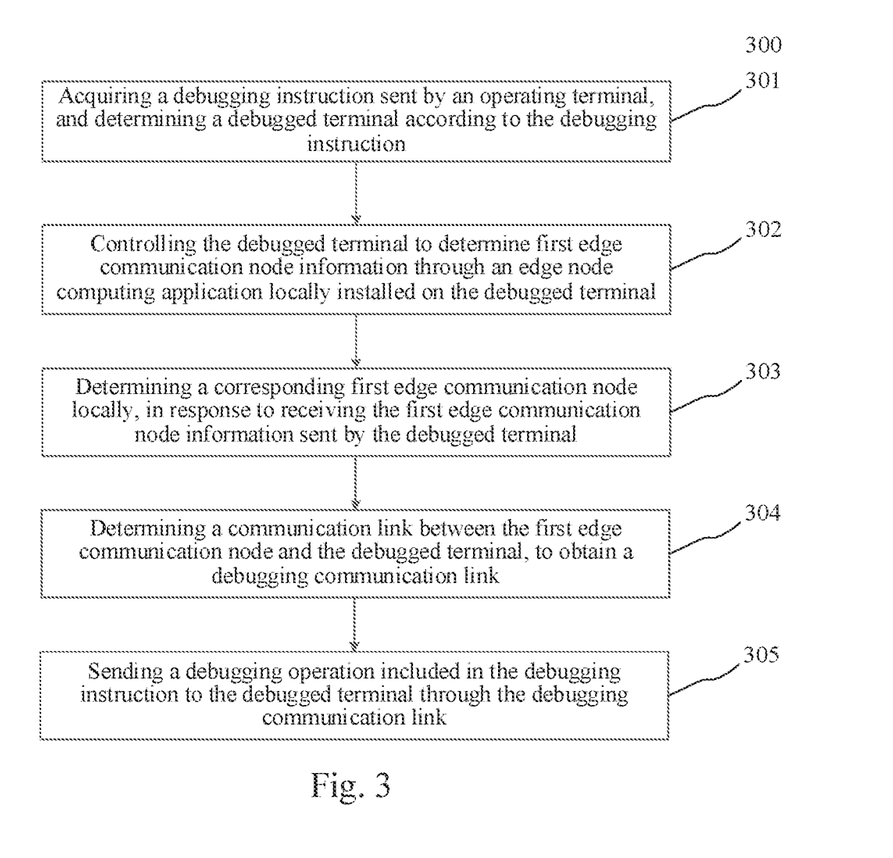
FIG. 3 is a flowchart of the method for sending a debugging instruction according to another embodiment of the present disclosure.

On the basis of the foregoing embodiment, another embodiment of the present disclosure also provides a flow 300 of the method for sending a debugging instruction through FIG. 3, which includes a specific step of determining the debugging communication link between the first edge communication node and the debugged terminal, including the following steps.

Step 301, acquiring a debugging instruction sent by an operating terminal, and determining a debugged terminal according to the debugging instruction.

Step 302, controlling the debugged terminal to determine first edge communication node information through an edge node computing application locally installed on the debugged terminal.

After determining the debugged terminal according to the debugging instruction, the executing body generates corresponding control information for controlling the debugged terminal to execute the local edge node computing application of the debugged terminal, and sends the control information to the debugged terminal for controlling the debugged terminal to use the local edge node computing application of the debugged terminal to determine the first edge communication node and send the first edge communication node information to the executing body after generating the first edge communication node information.

Step 303, determining a corresponding first edge communication node locally, in response to receiving the first edge communication node information sent by the debugged terminal.

Step 304, determining a communication link between the first edge communication node and the debugged terminal, to obtain a debugging communication link.

The operation of establishing the debugging communication link is performed in the above process to establish the debugging communication link for the communication between the executing body and the debugged terminal.

Step 305, sending a debugging operation included in the debugging instruction to the debugged terminal through the debugging communication link.

In the present embodiment, a specific method for determining the debugging communication link is provided, which may establish the debugging communication link after receiving the debugging instruction and determining the corresponding debugged terminal, so as to avoid long-term vacant of the debugging communication link and waste of resources.

Figure 4:
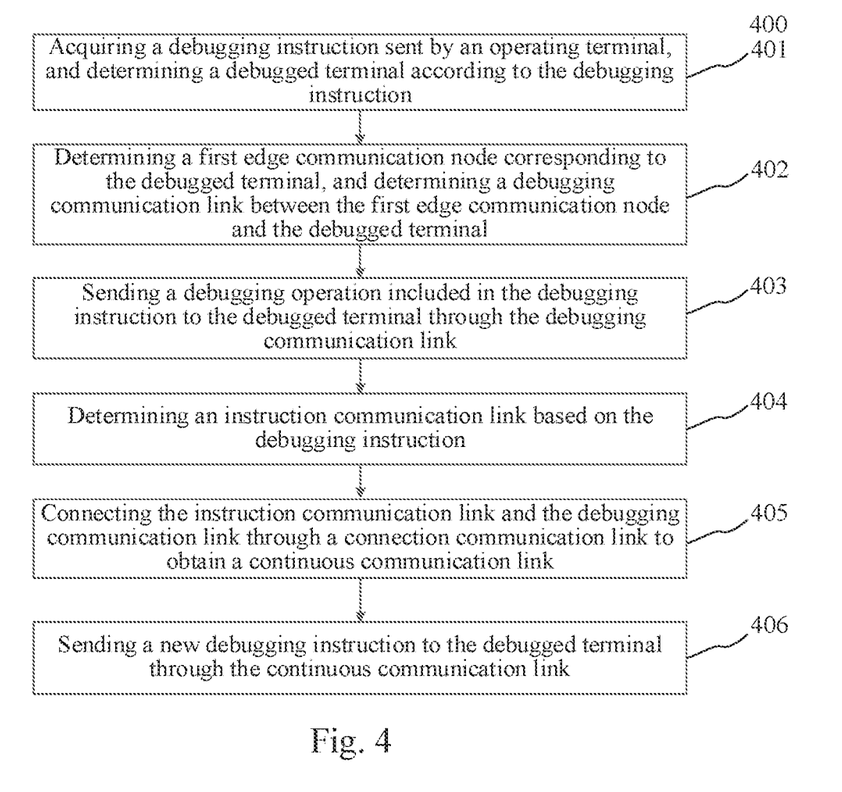
FIG. 4 is a flowchart of the method for sending a debugging instruction according to yet another embodiment of the present disclosure.

On the basis of the above embodiment shown in FIG. 2, yet another embodiment of the present disclosure also provides a flow 400 of the method for sending a debugging instruction through FIG. 4, to illustrate the method for sending a debugging instruction to the debugged terminal subsequently on the basis of the embodiment shown in FIG. 2, which includes the following steps.

Step 401, acquiring a debugging instruction sent by an operating terminal, and determining a debugged terminal according to the debugging instruction.

Step 402, determining a first edge communication node corresponding to the debugged terminal, and determining a debugging communication link between the first edge communication node and the debugged terminal.

Step 403, sending a debugging operation included in the debugging instruction to the debugged terminal through the debugging communication link.

It should be understood that in the present embodiment, there is a subsequent debugging instruction sent to the debugged terminal, so that the debugging instruction sent in this step may only be used to instruct the executing body to determine the debugged terminal, then establish the debugging communication link with the debugged terminal to facilitate sending the corresponding operation instruction based on the debugging communication link subsequently.

In some embodiments, the debugging operation sent in step 403 may include a communication link establishment feedback operation, so that after the debugging communication link is established, the debugged terminal sends communication link establishment information for feedback. After receiving the feedback information, the executing body sends the feedback information to the operating terminal, so that the user may understand that the debugging communication link is successfully established and may issue the subsequent debugging instruction.

Step 404, determining an instruction communication link based on the debugging instruction.

Acquiring the communication link for communication between the executing body and the operating terminal, that is, the instruction communication link currently used to acquire the debugging instruction, may be implemented based on technologies such as websocket, mqtt, or http3, and the instruction communication link is generally a bi-directional communication link. In addition, it is also necessary to acquire the communication node used by the executing body locally to realize communication with the operating terminal.

The executing body and the operating terminal may perform content interaction using a method such as memory message queue, publish/subscribe mechanism based on Radis consistency, or message transfer mechanism based on mqtt.

Step 405, connecting the instruction communication link and the debugging communication link through a connection communication link to obtain a continuous communication link.

The connection communication link between the communication node determined in step 404 used by the executing body locally to realize communication with the operating terminal and the first edge communication node determined in step 402 is established locally in the executing body, so as to realize the communication between the communication node that communicates with the operating terminal and the first edge communication node through the connection communication link, that is, the instruction communication link and the debugging communication link may be connected through the connection communication link to generate a continuous communication link that may be used to start from the operating terminal and pass through the executing body and finally arrive at the debugged terminal.

It is also possible to set a keep-alive duration for the connection communication link to a preset duration, during which the debugging instruction received through the instruction communication link may be continuously sent to the debugging communication link through the connection communication link, or debugging result information received through the debugging communication link may be continuously sent to the instruction communication link.

Step 406, sending a new debugging instruction to the debugged terminal through the continuous communication link.

That is, the executing body may receive the debugging instruction from the operating terminal through the instruction communication link in the continuous communication link generated in the above step 405, and send the debugging instruction to the debugging communication link through the local connection communication link, and send the debugging instruction to the debugged terminal through the debugging communication link.

In some embodiments, similarly, after the instruction communication link and the debugging communication link are connected by the connection communication link to form a complete information communication link, the debugged terminal may generate corresponding feedback information and returns the feedback information to the operating terminal, in order to facilitate the user to issue the subsequent debugging instruction.

It should be understood that the above steps 401-403 are the same as steps 201-203 shown in FIG. 2. For content of the same part, reference may be made to the corresponding part of the embodiment in FIG. 2, and detailed description thereof will be omitted. In addition, the implementation provided in steps 404-406 in the present embodiment may also be combined with the content in the embodiment shown in FIG. 3 to obtain a further implementation that includes the corresponding effects of the embodiment in FIG. 3 and the embodiment in FIG. 4, respectively.

In the method for sending a debugging instruction provided in the present embodiment, the continuous communication link between the operating terminal, the executing body and the debugged terminal may be established, so that through the continuous communication link, the debugging instruction sent by the operating terminal may be quickly sent to the debugged terminal through the executing body, improving the efficiency of issuing a debugging instruction.

In some alternative implementations of the present embodiment, the determining an instruction communication link based on the debugging instruction includes: determining a second edge communication node for establishing the instruction communication link locally, in response to receiving instruction communication link establishment information sent by the operating terminal; where the second edge communication node is determined based on second edge communication node information sent by the operating terminal, and the second edge communication node information is determined based on an edge node computing application locally installed on the operating terminal; and establishing a communication link between the second edge communication node and the operating terminal to obtain the instruction communication link.

Similarly, when establishing the instruction communication link between the executing body and the operating terminal, it may refer to the method for establishing the debugging communication link between the executing body and the debugged terminal, that is, using the edge node computing application locally installed on the operating terminal to determine the corresponding second edge communication node, and then determine a new instruction communication link based on the second edge communication node, so as to update the original instruction communication link between the executing body and the operating terminal, to improve the efficiency of sending a debugging instruction between the executing body and the operating terminal.

On the basis of any one of the foregoing embodiments, considering that after the debugged terminal completes the corresponding debugging operation, in order to better understand an execution status and/or debugging result of the debugging operation, the debugged terminal may feedback the debugging result information to the executing body. In this case, a method for sending a debugging instruction may further include: controlling the debugged terminal to return corresponding debugging result information after executing the debugging instruction; and returning the debugging result information to the operating terminal, in response to receiving the debugging result information returned by the debugged terminal through the debugging communication link.

The debugging operation may include: instructing the debugged terminal to generate the corresponding debugging result information and feedback the corresponding debugging result information to the executing body after executing the debugging instruction, or determining a feedback time condition according to a predetermined time rule or a time rule recorded in the debugging instruction, etc., controlling the debugged terminal to feedback the corresponding debugging result information in response to determining that the feedback time condition is satisfied, and returning the debugging result information to the operating terminal through the communication link with the operating terminal after receiving the debugging result information, so that the operating terminal acquires the debugging result information, and then formulates a corresponding strategy based on the debugging result information.

In addition, on the basis of any one of the foregoing embodiments, when considering improving the method for sending a debugging instruction from the perspective of the debugging instruction and the debugging result information, a method for sending a debugging instruction further includes: performing at least one information processing operation of validity authentication processing, message caching processing, or orderliness guarantee processing on an acquired content, in response to acquiring any one of the debugging instruction or the debugging result information.

After receiving the debugging instruction sent through the instruction communication link and/or the debugging result information fed back through the debugging communication link, the executing body may perform at least one information processing operation of validity authentication processing, message caching processing, or orderliness guarantee processing on the received debugging instruction or the debugging result information, to achieve the ability to provide guarantees for the integrity and orderliness of the content.

Figure 5:
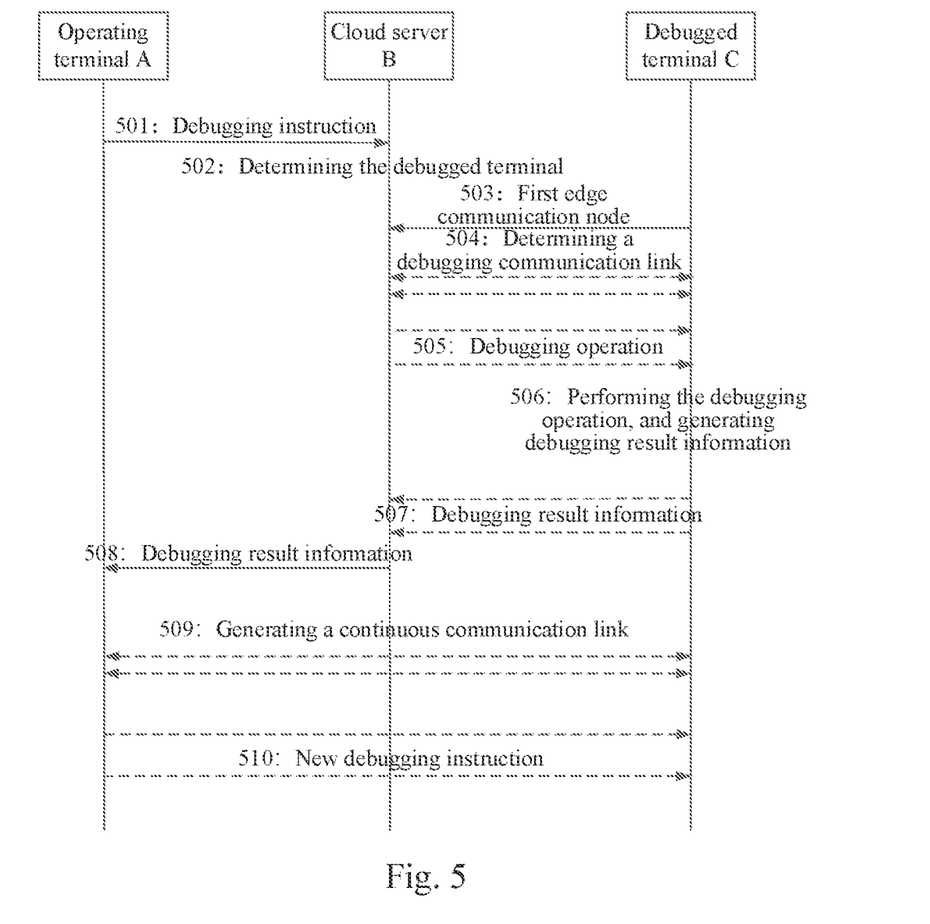
FIG. 5 is a schematic diagram of interaction in an application scenario of the method for sending a debugging instruction according to an embodiment of the present disclosure.

In order to deepen understanding, an embodiment of the present disclosure further provides a specific implementation in combination with a specific application scenario. In the specific application scenario, an operating terminal A sends a debugging instruction to a cloud server B, to realize remote debugging of a debugged terminal C through the cloud server. Referring to FIG. 5, the specific process is as follows.

Step 501, a user may send the debugging instruction to the cloud server B through the operating terminal A, in order to debug the debugged terminal C.

Step 502, after receiving the debugging instruction sent by the operating terminal A, the cloud server B determines the debugged terminal C.

Step 503, a first edge communication node is determined based on the debugged terminal C.

Step 504, a debugging communication link is determined between the cloud server B and the debugged terminal C.

Step 505, the cloud server B sends a debugging operation in the debugging instruction to the debugged terminal through the debugging communication link.

Step 506, after the debugged terminal C is debugged, corresponding debugging result information is generated.

Step 507, after generating the debugging result information, the debugged terminal C sends the debugging result information to the cloud server B.

Step 508, after receiving the debugging result information sent by the debugged terminal C, the cloud server B returns the debugging result information to the operating terminal A.

In addition, it may also include step 509, the cloud server B generates a connection communication link locally, and connects an instruction communication link between the operating terminal A and the cloud server B and the debugging communication link between the cloud server B and the debugged terminal C through the connection communication link, to obtain a continuous communication link.

Step 510, the operating terminal A may send a new debugging instruction to the debugged terminal C through the continuous communication link generated in the above step 509.

It can be seen from this application scenario that in the method for sending a debugging instruction provided in the present embodiment, after acquiring the debugging instruction sent by the operating terminal, the debugged terminal and the first edge communication node corresponding to the debugged terminal are determined according to the debugging instruction, and the debugging communication link between the first edge communication node and the debugged terminal is determined, the first edge communication node is determined based on the first edge communication node information sent by the debugged terminal, and the first edge communication node information is determined and obtained based on the edge node computing application locally installed on the debugged terminal, and the debugging operation included in the debugging instruction is sent to the debugged terminal through the debugging communication link. The communication link is determined based on the edge node computing application installed on the debugged terminal to improve the efficiency of sending a debugging instruction.

Figure 6:
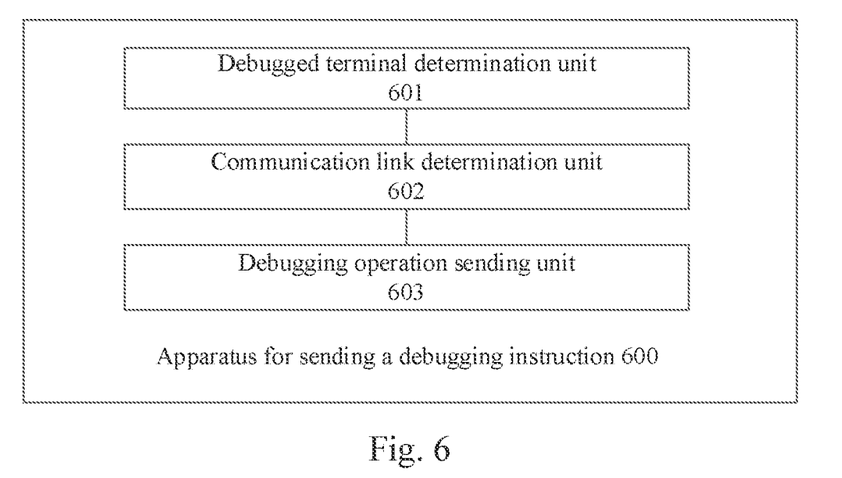
FIG. 6 is a schematic structural diagram of an apparatus for sending a debugging instruction according to an embodiment of the present disclosure.

As shown in FIG. 6, an apparatus 600 for sending a debugging instruction of the present embodiment may include: a debugged terminal determination unit 601, configured to acquire a debugging instruction sent by an operating terminal, and determine a debugged terminal according to the debugging instruction; a communication link determination unit 602, configured to determine a first edge communication node corresponding to the debugged terminal, and determine a debugging communication link between the first edge communication node and the debugged terminal; the first edge communication node being determined based on first edge communication node information sent by the debugged terminal, and the first edge communication node information being determined and obtained based on an edge node computing application locally installed on the debugged terminal; and a debugging operation sending unit 603, configured to send an debugging operation included in the debugging instruction to the debugged terminal through the debugging communication link.

In some alternative implementations of the present embodiment, the communication link determination unit 602 further includes: a first communication node determination subunit, configured to control the debugged terminal to determine the first edge communication node information through the edge node computing application locally installed on the debugged terminal; a first communication node determination subunit, configured to determine the corresponding first edge communication node locally, in response to receiving the first edge communication node information sent by the debugged terminal; and a first communication link determination subunit, configured to determine a communication link between the first edge communication node and the debugged terminal, to obtain the debugging communication link.

In some alternative implementations of the present embodiment, the apparatus for sending a debugging instruction further includes: a connection communication link establishment unit; and the communication link establishment unit includes: an instruction communication link acquisition subunit, configured to determine an instruction communication link based on the debugging instruction; a continuous communication link generation subunit, configured to connect the instruction communication link and the debugging communication link through a connection communication link to obtain a continuous communication link; and the debugging operation sending unit is further configured to send a new debugging instruction to the debugged terminal through the continuous communication link.

In some alternative implementations of the present embodiment, the continuous communication link generation subunit includes: a second communication node establishment submodule, configured to determine a second edge communication node for establishing the instruction communication link locally, in response to receiving instruction communication link establishment information sent by the operating terminal; where, the second edge communication node is determined based on second edge communication node information sent by the operating terminal, and the second edge communication node information is determined based on an edge node computing application locally installed on the operating terminal; and a second communication link establishment submodule, configured to establish a communication link between the second edge communication node and the operating terminal to obtain the instruction communication link.

In some alternative implementations of the present embodiment, the apparatus for sending a debugging instruction further includes: a debugged terminal controlling unit, configured to control the debugged terminal to return corresponding debugging result information after executing the debugging instruction; and a debugging result returning unit, configured to return the debugging result information to the operating terminal, in response to receiving the debugging result information returned by the debugged terminal through the debugging communication link.

In some alternative implementations of the present embodiment, the apparatus for sending a debugging instruction further includes: an information processing unit, configured to perform at least one information processing operation of validity authentication processing, message caching processing, or orderliness guarantee processing on an acquired content, in response to acquiring any one of the debugging instruction or the debugging result information.

The present embodiment serves as an apparatus embodiment corresponding to the foregoing method embodiments, and for the same content, reference may be made to the description of the foregoing method embodiments, detailed description thereof will be omitted. Through the apparatus for sending a debugging instruction provided in embodiments of the present disclosure, the communication link is determined based on the edge node computing application installed on the debugged terminal to improve the efficiency of sending a debugging instruction.

Figure 7:
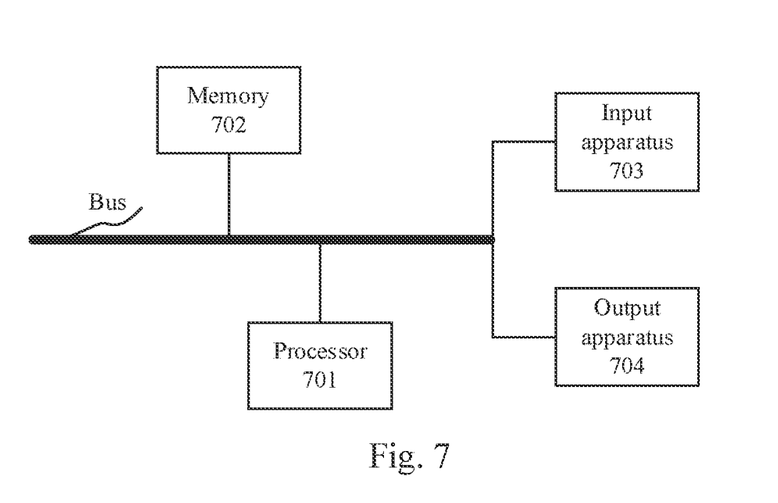
FIG. 7 is a block diagram of an electronic device for implementing the method for sending a debugging instruction according to an embodiment of the present disclosure.

As shown in FIG. 7, a block diagram of an electronic device for implementing the method for sending a debugging instruction according to an embodiment of the present disclosure is illustrated. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 7, the electronic device includes: one or more processors 701, a memory 702, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 7, one processor 701 is used as an example.

The memory 702 is a non-transitory computer readable storage medium provided by embodiments of the present disclosure. The memory stores instructions executable by at least one processor, so that the at least one processor performs the method for sending a debugging instruction provided by embodiments of the present disclosure. The non-transitory computer readable storage medium of embodiments of the present disclosure stores computer instructions for causing a computer to perform the method for sending a debugging instruction provided by embodiments of the present disclosure.

The memory 702, as a non-transitory computer readable storage medium, may be used to store non-transitory software programs, non-transitory computer executable programs and modules, such as program instructions/modules corresponding to the method for sending a debugging instruction in embodiments of the present disclosure (for example, the debugged terminal determination unit 601, the communication link determination unit 602 and the debugging operation sending unit 603 as shown in FIG. 6). The processor 701 executes the non-transitory software programs, instructions, and modules stored in the memory 702 to execute various functional applications and data processing of the server, that is, to implement the method for sending a debugging instruction in the foregoing method embodiments.

The memory 702 may include a storage program area and a storage data area, where the storage program area may store an operating system and an application program required by at least one function; and the storage data area may store data created by the use of the electronic device for sending a debugging instruction, etc. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include memories remotely provided with respect to the processor 701, and these remote memories may be connected to the electronic device for sending a debugging instruction through a network. Examples of the above network include but are not limited to the Internet, intranet, local area network, mobile communication network, and combinations thereof.

The electronic device for performing the method for sending a debugging instruction may further include: an input apparatus 703 and an output apparatus 704. The processor 701, the memory 702, the input apparatus 703, and the output apparatus 704 may be connected through a bus or in other methods. In FIG. 7, connection through a bus is used as an example.

The input apparatus 703 may receive input digital or character information, and generate key signal inputs related to user settings and function control of the electronic device for sending a debugging instruction, such as touch screen, keypad, mouse, trackpad, touchpad, pointing stick, one or more mouse buttons, trackball, joystick and other input apparatuses. The output apparatus 704 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and Internet.

The computer system may include a client and a server. The client and the server are generally remote from each other and typically interact through the communication network. The relationship between the client and the server is generated through computer programs running on the respective computers and having a client-server relationship to each other.

Cloud computing refers to the elastic and scalable shared physical or virtual resource pool accessed through the network. Resources may include servers, operating systems, networks, software, applications, storage devices, etc., and technical systems that may deploy and manage resources in an on-demand, self-service way. Using cloud computing technology, it may provide efficient and powerful data processing capabilities for artificial intelligence, blockchain and other technology applications and model training.

According to the technical solution of embodiments of the present disclosure, after acquiring the debugging instruction sent by the operating terminal, the debugged terminal and the first edge communication node corresponding to the debugged terminal are determined according to the debugging instruction, and the debugging communication link between the first edge communication node and the debugged terminal is determined, the first edge communication node is determined based on the first edge communication node information sent by the debugged terminal, and the first edge communication node information is determined and obtained based on the edge node computing application locally installed on the debugged terminal, and the debugging operation included in the debugging instruction is sent to the debugged terminal through the debugging communication link. The communication link is determined based on the edge node computing application installed on the debugged terminal to improve the efficiency of sending a debugging instruction.

It should be understood that the various forms of processes shown above may be used to resort, add or delete steps. For example, the steps described in embodiments of the present disclosure may be performed in parallel, sequentially, or in a different order. As long as the desired result of the technical solution disclosed in embodiments of the present disclosure can be achieved, no limitation is made herein.

Embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of embodiments of the present disclosure should be included within the scope of protection of the present disclosure.

What is claimed is:

1. A method for sending a debugging instruction, the method comprising:
   acquiring the debugging instruction sent by an operating terminal, and determining a debugged terminal according to the debugging instruction;
   based on first edge communication node information sent by the debugged terminal, determining a first edge communication node, from a plurality of edge communication nodes that are pre-established locally, corresponding to the debugged terminal, to establish a debugging communication link between the first edge communication node and the debugged terminal; the first edge communication node information being determined and obtained based on an edge node computing application locally installed on the debugged terminal; and
   sending a debugging operation included in the debugging instruction to the debugged terminal through the debugging communication link.

2. The method according to claim 1, wherein to establish the debugging communication link between the first edge communication node and the debugged terminal comprises:
   controlling the debugged terminal to determine the first edge communication node information through the edge node computing application locally installed on the debugged terminal;
   determining the corresponding first edge communication node locally, in response to receiving the first edge communication node information sent by the debugged terminal; and
   determining a communication link between the first edge communication node and the debugged terminal, to obtain the debugging communication link.

3. The method according to claim 1, further comprising:
   determining a local instruction communication link based on the debugging instruction;
   connecting the local instruction communication link and the debugging communication link through a connection communication link to obtain a continuous communication link; and
   sending a new debugging instruction to the debugged terminal through the continuous communication link.

4. The method according to claim 3, wherein the determining the local instruction communication link based on the debugging instruction comprises:
   determining a second edge communication node, from the plurality of edge communication nodes, for establishing the local instruction communication link, in response to receiving instruction communication link establishment information sent by the operating terminal; wherein, the second edge communication node is determined based on second edge communication node information sent by the operating terminal, and the second edge communication node information is determined based on the edge node computing application locally installed on the operating terminal; and
   establishing a communication link between the second edge communication node and the operating terminal to obtain the local instruction communication link.

5. The method according to claim 1, further comprising:
   controlling the debugged terminal to return corresponding debugging result information after executing the debugging instruction; and
   returning the debugging result information to the operating terminal, in response to receiving the debugging result information returned by the debugged terminal through the debugging communication link.

6. The method according to claim 5, further comprising:
   performing at least one information processing operation of validity authentication processing, message caching processing, or orderliness guarantee processing on an acquired content, in response to acquiring any one of the debugging instruction or the debugging result information.

7. An electronic device, comprising:
   one or more processors; and
   one or more memories, communicatively connected with the one or more processors; the one or more memories collectively storing instructions executable by the one or more processors, the instructions, when executed by the one or more processors, causing the one or more processors to collectively to perform operations, the operations comprising:
   acquiring a debugging instruction sent by an operating terminal, and determining a debugged terminal according to the debugging instruction;
   based on first edge communication node information sent by the debugged terminal, determining a first edge communication node, from a plurality of edge communication nodes that are pre-established locally, corresponding to the debugged terminal, to establish a debugging communication link between the first edge communication node and the debugged terminal; the first edge communication node information being determined and obtained based on an edge node computing application locally installed on the debugged terminal; and
   sending a debugging operation included in the debugging instruction to the debugged terminal through the debugging communication link.

8. The electronic device according to claim 7, wherein to establish the debugging communication link between the first edge communication node and the debugged terminal comprises:
   controlling the debugged terminal to determine the first edge communication node information through the edge node computing application locally installed on the debugged terminal;
   determining the corresponding first edge communication node locally, in response to receiving the first edge communication node information sent by the debugged terminal; and
   determining a communication link between the first edge communication node and the debugged terminal, to obtain the debugging communication link.

9. The electronic device according to claim 7, the operations further comprising:
   determining a local instruction communication link based on the debugging instruction;
   connecting the local instruction communication link and the debugging communication link through a connection communication link to obtain a continuous communication link; and
   sending a new debugging instruction to the debugged terminal through the continuous communication link.

10. The electronic device according to claim 9, wherein the determining the local instruction communication link based on the debugging instruction comprises:
    determining a second edge communication node, from the plurality of edge communication nodes, for establishing the local instruction communication link, in response to receiving instruction communication link establishment information sent by the operating terminal; wherein, the second edge communication node is determined based on second edge communication node information sent by the operating terminal, and the second edge communication node information is determined based on the edge node computing application locally installed on the operating terminal; and establishing a communication link between the second edge communication node and the operating terminal to obtain the local instruction communication link.

11. The electronic device according to claim 7, the operations further comprising:
controlling the debugged terminal to return corresponding debugging result information after executing the debugging instruction; and
returning the debugging result information to the operating terminal, in response to receiving the debugging result information returned by the debugged terminal through the debugging communication link.

12. The electronic device according to claim 11, the operations further comprising:
performing at least one information processing operation of validity authentication processing, message caching processing, or orderliness guarantee processing on an acquired content, in response to acquiring any one of the debugging instruction or the debugging result information.

13. A non-transitory computer readable storage medium, storing computer instructions, the computer instructions being used to cause a computer to perform operations, the operations comprising:
acquiring a debugging instruction sent by an operating terminal, and determining a debugged terminal according to the debugging instruction;
based on first edge communication node information sent by the debugged terminal, determining a first edge communication node, from a plurality of edge communication nodes that are pre-established locally, corresponding to the debugged terminal, to establish a debugging communication link between the first edge communication node and the debugged terminal; the first edge communication node information being determined and obtained based on an edge node computing application locally installed on the debugged terminal; and
sending a debugging operation included in the debugging instruction to the debugged terminal through the debugging communication link.

14. The non-transitory computer readable storage medium according to claim 13, wherein to establish the debugging communication link between the first edge communication node and the debugged terminal comprises:

controlling the debugged terminal to determine the first edge communication node information through the edge node computing application locally installed on the debugged terminal;
determining the corresponding first edge communication node locally, in response to receiving the first edge communication node information sent by the debugged terminal; and
determining a communication link between the first edge communication node and the debugged terminal, to obtain the debugging communication link.

15. The non-transitory computer readable storage medium according to claim 13, the operations further comprising:
determining a local instruction communication link based on the debugging instruction;
connecting the local instruction communication link and the debugging communication link through a connection communication link to obtain a continuous communication link; and
sending a new debugging instruction to the debugged terminal through the continuous communication link.

16. The non-transitory computer readable storage medium according to claim 15, wherein the determining the local instruction communication link based on the debugging instruction comprises:
determining a second edge communication node, from the plurality of edge communication nodes, for establishing the local instruction communication link, in response to receiving instruction communication link establishment information sent by the operating terminal; wherein, the second edge communication node is determined based on second edge communication node information sent by the operating terminal, and the second edge communication node information is determined based on the edge node computing application locally installed on the operating terminal; and
establishing a communication link between the second edge communication node and the operating terminal to obtain the local instruction communication link.

17. The non-transitory computer readable storage medium according to claim 13, the operations further comprising:
controlling the debugged terminal to return corresponding debugging result information after executing the debugging instruction; and
returning the debugging result information to the operating terminal, in response to receiving the debugging result information returned by the debugged terminal through the debugging communication link.

18. The non-transitory computer readable storage medium according to claim 17, the operations further comprising:
performing at least one information processing operation of validity authentication processing, message caching processing, or orderliness guarantee processing on an acquired content, in response to acquiring any one of the debugging instruction or the debugging result information.

* * * * *